Figure 1:
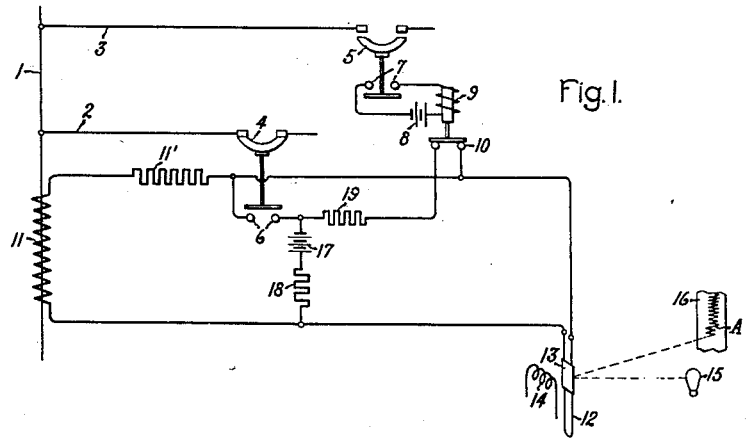

March 16, 1937.  R. C. BUELL  2,074,142
RECORDING INSTRUMENT
Filed Jan. 30, 1932   2 Sheets-Sheet 1

Inventor:
Roy C. Buell,
by Charles A. Mullen
His Attorney.

March 16, 1937.        R. C. BUELL        2,074,142
RECORDING INSTRUMENT
Filed Jan. 30, 1932        2 Sheets-Sheet 2

Inventor:
Roy C. Buell,
by Charles E. ...
His Attorney

Patented Mar. 16, 1937

2,074,142

UNITED STATES PATENT OFFICE 2,074,142

RECORDING INSTRUMENT

Roy C. Buell, Schenectady, N. Y., assignor to General Electric Company, a corporation of New York Application January 30, 1932, Serial No. 589,884

15 Claims. (Cl. 234—1.5)

My invention relates to electrical recording apparatus and has for its principal object the provision of arrangements for superimposing records of one or more isolated events upon a continuous record of values of a quantity being measured by a recording instrument. Another object of my invention is to increase the usefulness and the amount of information which may be recorded by oscillographs of the type now in use, and a further object is to coordinate records of the operation of electrical apparatus with the record of the values of current, voltage or other electrical quantities in the circuits of the apparatus. Still another object of my invention is to coordinate upon a single record strip records of the operation of various pieces of equipment and continuous records of quantities being measured in electrical circuits. An additional object of my invention is to provide arrangements whereby one or more events may be recorded on a single record curve by the use of very little added material and at a negligible cost. Other and further objects will become apparent as the description proceeds.

Recording instruments and particularly those of the high speed or oscillograph type find very useful application in making studies of various types of apparatus. Oscillographs of the type now in use are frequently provided with several current responsive recording elements in order that several different quantities may be recorded simultaneously in connection with the study of a piece of apparatus or an electrical circuit or circuits. In connection with the study of an electrical distribution system, for instance, there may be a number of separate circuits each provided with circuit breakers or other apparatus, the operation of any of which tends to affect the currents, voltages, or other quantities flowing or existing in the other circuits. When several circuits are involved it is difficult without a supplementary record to determine from the curves of the various measured quantities when and which one of the circuit breakers or other pieces of apparatus operated. In such cases, however, all of the recording elements of an oscillograph are usually required to obtain continuous records of the desired quantities so that none are available for use merely to record events such as the operation of electrical apparatus.

In accordance with my invention, one or all of the current responsive recording elements of an oscillograph or other recording instrument may be used for continuously recording instantaneous values in the circuits to be measured and in addition to these continuous records additional records of isolated events such as the operation of certain pieces of electrical apparatus may be superimposed upon the curves providing the continuous records.

In carrying out my invention in its preferred form, I provide means for impressing a supplementary current upon the current flowing in an oscillograph element in order to offset permanently or momentarily the curve providing a continuous record. Several different events may be recorded in the same curve by causing offsets of different magnitudes, each one representing a specific event. The character of the offset may also be modified in order to differentiate one event from the other. If the supplementary currents are supplied through a number of different supplementary recording circuits containing different combinations and values of resistance, inductance, and capacity, both the magnitude and character of the offset may be controlled.

Figure 2:
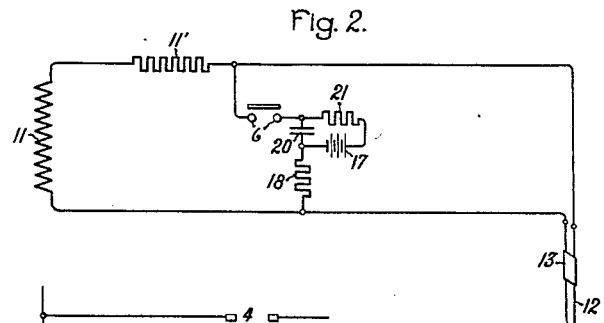
Figure 3:
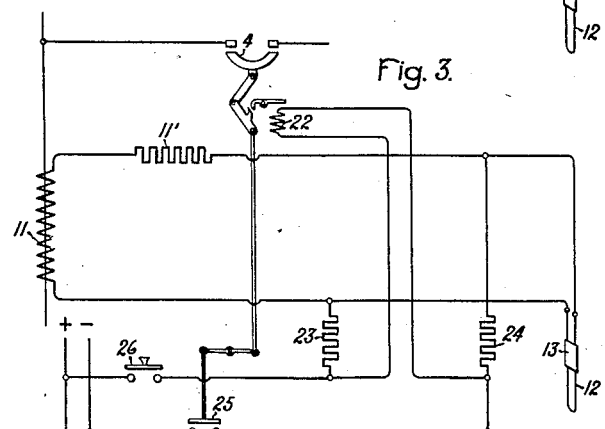
Figure 7:
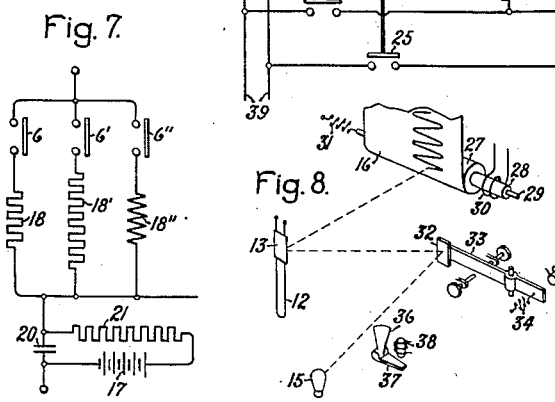
Figure 8:
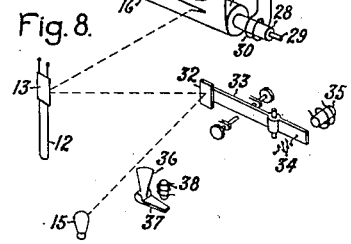
Figure 4:
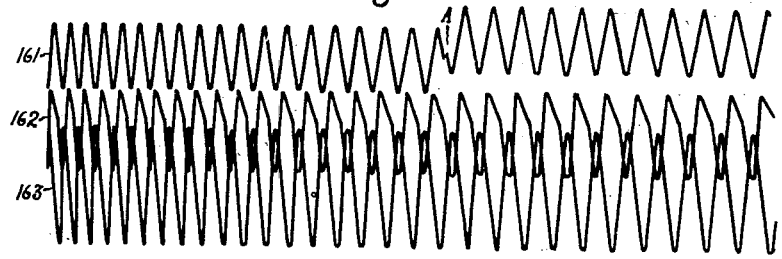
Figure 5:
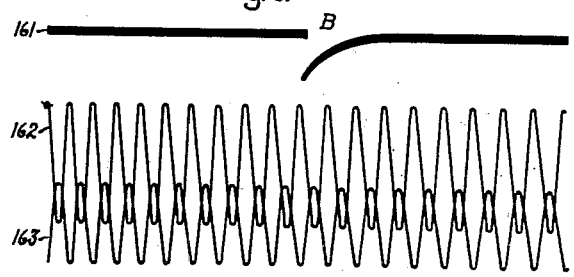
Figure 6:
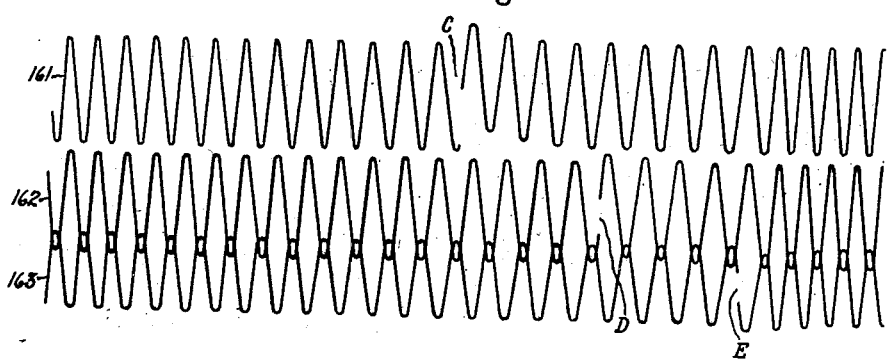

The features of my invention which I believe to be novel and patentable will be pointed out in the claims appended hereto. My invention itself, however, will be best understood by referring to the following description taken in connection with the accompanying drawings in which Fig. 1 is a schematic diagram of an arrangement for offsetting a record curve upon the occurrence of a certain event; Fig. 2 is a circuit diagram of an arrangement for offsetting the record curve only momentarily; Fig. 3 is a schematic diagram of a modified arrangement for obtaining an offset in the curve for the duration of an event such as the tripping out of a circuit breaker; Fig. 4 represents a plurality of record curves obtained from an oscillograph in which one of the curves is offset by using an arrangement of the type shown in Fig. 1; Figs. 5 and 6 are oscillograph curves obtained from an instrument in which one or more of the elements are connected in the manner shown in Fig. 2; Fig. 7 represents a modified arrangement for obtaining records of a plurality of different events; and Fig. 8 represents mechanical arrangements for offsetting the record curve.

Referring now more in detail to the drawings in which like reference characters refer to like parts throughout, I have represented an alternating current system by one of its conductors 1 feeding branch circuits having conductors 2 and 3. The circuits of conductors 2 and 3 are made or broken by means of circuit breakers 4 and 5 having auxiliary contacts 6 and 7 respectively. The contacts 7 of circuit breaker 5 are utilized to open or close a circuit through the battery 8 and winding 9 of a contactor having normally closed contacts 10.

In order to obtain a record of the currents flowing in conductor 1 it is connected in series with the primary of a current transformer having a secondary winding 11 actuating the current responsive element 12 of a recording instrument. The recording instrument may be of any suitable type and as here shown includes one or more units having current responsive elements 12 carrying vibrating mirrors 13, windings 14 producing fields for the elements 12, a continuously energized source of light 15, and a moving record film 16. Although, for the sake of illustration I have shown apparatus and curves which will be characteristic of an alternating-current circuit, it will be understood that my apparatus is not limited to such circuits, but will be of value in any case where it is desired to superimpose a record of an isolated event upon a record curve which is already used to indicate continuously the values of a desired quantity. Suitable means are employed as is well known in the art to prevent the winding 11 from sending an excessive current through the current responsive element 12. In the present arrangement I have shown a series resistor 11' to accomplish this purpose.

The deflection of the element 12 provides a continuous record of the magnitude of the current flowing through its windings. The arrangement may also be made such that this current varies in accordance with the voltage, power, or some other quantity in an electrical circuit or in accordance with the magnitude of some quantity as will be measured in non-electrical apparatus as will be well understood.

In order to provide in addition to this continuous record, a record of an isolated event, I provide means for offsetting the record curve upon the occurrence of the event. This may be done, for example, by sending a supplementary current through the recording element 12 when the event occurs. In Fig. 1 this means takes the form of a battery 17 connected in series with a current limiting resistor 18 and the switch 6 in a group which is connected in parallel to the current responsive element 12. Upon the occurrence of an event to be recorded, for example, upon the opening of the circuit breaker 4, the switch 6 is closed and a direct current is added to the current flowing in element 12.

In Fig. 4 the curve 161 represents the continuous record of a quantity being recorded by element 12 and the offset in this curve from the normal axis at the point A represents the occurrence of an event which causes the closing of switch 6 and an increase in the absolute value of the current flowing in the element 12. The curves 162 and 163 represent values recorded by other elements of an oscillograph or other type of recording instrument, but it will be understood that the curves shown in Fig. 4 are only illustrative as my invention may be utilized with recording devices having any number of elements, and the offsetting arrangement shown for curve 161 may be applied also to one or more of the other elements of the instrument.

If the operation to be recorded by the offset is a reversible one, an operation in the reverse direction such as the reclosing of circuit breaker 4 will obviously be indicated by the opening of the switch 6 and the restoration of curve 161 to the normal axis. The moving mechanism of circuit breaker 4 is shown as being mechanically connected to the switch 6 of the supplementary recording circuit 6—17—18, but obviously I am not limited to this exact arrangement. Circuit breaker 5, for example, which might be at a distance from the other apparatus, has auxiliary contacts 7 arranged to control a relay 9 having normally closed contacts 10 arranged to close a circuit through battery 17, resistor 19, contacts 10, current responsive element 12, and resistor 18 when circuit breaker 5 opens and the relay 9 is deenergized by the opening of contacts 7.

Accordingly, a record is obtained when either of the breakers opens, and the difference in resistance in the supplementary recording circuits causes the offsets to be different in amount thereby indicating which of the breakers operated. Obviously by duplicating the supplementary recording circuits wholly or in part and utilizing constants having appropriate values additional events might also be recorded on the single record curve 161.

In Fig. 2 there is shown an arrangement for offsetting only momentarily the curve produced by element 12. In this arrangement a resistor 18, condenser 20, and switch 6 form a series group which is connected in parallel to the element 12. The condenser 20 is maintained at a fixed potential by means of the battery 17 connected in series with a resistor 21 of relatively great resistance. When the switch 6 is open and no current is flowing in the circuit, condenser 20 is charged to the potential of battery 17. Upon the occurrence of an event which closes switch 6, the condenser 20 discharges through element 12 and a momentary surge of current causes the curve produced by element 12 to be offset momentarily. However, upon the discharge of the condenser, owing to the high resistance of resistor 21, the battery 17 is unable to send sufficient current through the element 12 to continue producing an appreciable offset in curve 161.

In Fig. 5 is represented at B a momentary offset produced by the arrangement of Fig. 2 when winding 11 is not energized.

In Fig. 6 a corresponding record is shown as it appears when the winding 11 is energized and the element 12 produces a continuous record of the currents supplied by winding 11. As in the previous case the momentary offset at C in curve 161 indicates the occurrence of an isolated event which was to be recorded. Obviously each of the recording elements may be provided with an offsetting arrangement. Offsets are shown in curve 162 at the point D and in curve 163 at the point E. The offsets at C, D, and E indicate not merely the occurrence of three independent events, but also the sequence in which the events occurred and the time intervals between the events. In the case illustrated, event D occurred four cycles after event C, and event E occurred four cycles after event D.

Like the arrangement shown in Fig. 1, that in Fig. 2 may also be adapted to the recording of a plurality of isolated events on a single curve by a partial duplication of the parts of the supplementary recording circuit. For example, in the arrangement partially shown in Fig. 7, which represents a modification in the portion of the circuit shunted across the current-responsive element 12, a plurality of switches 6, 6', and 6'' are utilized, each one being arranged to be closed upon the occurrence of a different event. A resistor 18' having an appreciably greater resistance than resistor 18 is associated with switch 6'. Consequently, the offset produced by closing switch 7

6' will be smaller than that produced by switch 6. Since the time constants of the circuits will be different with different values of resistance, the offset curve will be restored to the normal axis more rapidly in one case than in the other so that an additional means of distinguishing the indications of events is provided.

With switch 6" there is associated an inductive impedance 18" instead of a resistance. Owing to the loading effect of the inductance, when switch 6" is closed the curve will be offset gradually instead of abruptly, thereby distinguishing the offset from that produced when either switch 6 or 6' is closed. Although I have described a specific arrangement of switches, inductances, resistances, and capacity, it will be understood that my invention is not limited thereto, but that it obviously includes other combinations which may be modified to suit the application for which my invention is utilized.

A modified arrangement is shown in Fig. 3 which may be used, for example, in connection with a circuit breaker to provide a separate record of the instant at which the trip coil is energized and the instant at which the circuit breaker actually opens. A trip coil 22 of a circuit breaker 4 is connected in parallel with element 12 through the resistors 23 and 24. Switch 25 attached to the mechanism of circuit breaker 4 is closed while the circuit breaker is closed, and upon the closing of a tripping switch or push button 26 a circuit is closed from direct-current source 39 to the trip coil 22. The change in voltage across trip coil 22 produces a potential difference across the element 12 and accordingly increases the current flowing therein and offsets the record curve produced by element 12. When the breaker is fully opened, however, switch 25 opens and the circuit through trip coil 22 is opened stopping the flow of the supplementary current in element 12 so that the record is no longer offset. This method may be utilized to obtain two records on a single curve of any two events which must necessarily occur in succession without destroying the record of the flow of current, etc., produced by the curve itself.

The use of supplementary recording circuits to offset the curves of a recording instrument has the advantage of greatly extending the usefulness of the instrument at negligible cost since very little additional material is required and standard oscillographs or recording instruments may be utilized without reconstructing them. However, although I have shown and prefer to use electrical means for offsetting the record curves produced by the recording elements, my invention is not limited thereto, but obviously includes any suitable means for accomplishing the result. Mechanical means might also be employed. For example, in the arrangement shown in Fig. 8 the film 16 itself may be jerked to offset the curve. One of the rolls 27 supporting the film 16 is mounted upon a sleeve 28 carried by a shaft 29. The portion of the sleeve 28 within a solenoid 30 is composed of magnetic material so as to form a plunger cooperating with the solenoid 30, and the roll 27 is biased to a normal position by the spring 31. When the solenoid 30 is energized or deenergized, as the case may be, in response to the occurrence of an event, the roll 27 and the film 16 are jerked so as to offset the record curve.

In order to record a different event, a mirror 32 controlling the direction of the light beam may be mounted upon a lever 33 controlled by biasing spring 34 and magnet 35. The parts may be so dimensioned that energization or deenergization of the magnet 35 tilts the mirror 32 and deflects the light beam through such an angle as to offset the record curve on film 16 by a different amount than the offset produced by solenoid 30 in order that the records of the different events may be distinguished on the film 16.

While I have shown various methods for offsetting a record curve in order to record a plurality of events on a single curve without interfering with the continuous record of values recorded by the curve, my invention is not limited thereto, but obviously includes any means for changing the character or some characteristic of the record curve. In addition to offsetting the light beam numerous other methods of modifying the light beam will suggest themselves such as changing its thickness or its intensity. One method of modifying the intensity of the light beam is illustrated schematically by the sector 36 and armature 37 cooperating with the magnet 38. The sector 36 may be opaque in order to interrupt the light beam momentarily or comprised of a material absorbing only a portion of the light in order to change the intensity of the light beam. In order to interrupt the beam only momentarily, for example, the magnet 38 and sector 36 may be so arranged that when the magnet 38 is energized or deenergized, the sector 36 moves across the path of the light beam from one side thereof to the other.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with a current responsive oscillograph element, means for passing a current through said element representative of a quantity, the values of which are to be continuously recorded, a source of direct current having a substantially fixed voltage and means for impressing said voltage on said element upon the occurrence of an isolated event to be recorded.

2. In combination with the current responsive element of a curve-drawing recording instrument, means for causing a current to flow in said element varying in accordance with variation in magnitude of a quantity to be recorded to produce a continuous record thereof, and a supplementary current source, and means for connecting said source to said element upon the occurrence of an isolated event thereby superimposing a record of said event upon the continuous record produced by said element.

3. In combination with a current responsive oscillograph element, means for passing a current through said element representative of a quantity, the values of which are to be continuously recorded, a source of direct current having a substantially fixed voltage, and means for momentarily impressing said voltage upon said element upon the occurrence of an isolated event to be recorded.

4. In combination with the current responsive element of a curve-drawing recording instrument, means for causing a current to flow in said element varying in accordance with variation in magnitude of a quantity to be recorded to produce a continuous record thereof, and current-impulse producing apparatus, and means for connecting said apparatus in operative relation with said current responsive element upon the occurrence of an isolated event thereby superimposing the record of said event upon the continuous record produced by said element.

5. In combination with the current responsive element of a curve-drawing recording instrument, means for causing a current to flow in said element varying in accordance with variation in magnitude of a quantity to be recorded to produce a continuous record thereof, and supplementary current-producing means, a plurality of devices for setting at different magnitudes the strengths of current producible by said supplementary current-producing means, and means for connecting said supplementary current-producing means to said element subject to different current-setting devices in response to the occurrence of different isolated events.

6. In combination with the current responsive element of a recording instrument, means for passing a current through said element varying in accordance with variation in magnitude of a quantity to be recorded to produce a continuous record thereof, means for causing a supplementary current to flow therein upon the occurrence of an isolated event, and means for causing said supplementary current to cease flowing upon the occurrence of another isolated event.

7. In combination with an electrical system, a circuit breaker connected therein and an oscillograph having a current responsive element providing a continuous record of values of an electrical quantity in said system, means for causing a supplementary current to flow in the recording element of said oscillograph upon the operation of said circuit breaker in a given direction, and means for causing said supplementary current to cease flowing upon the operation of the circuit breaker in the opposite direction.

8. In combination with the current responsive element of a curve-drawing recording instrument, means for passing a current through said element representative of a quantity, the values of which are to be continuously recorded, a source of direct current, a resistor, a switch, said source, resistor and switch taken in series being connected in shunt to said current responsive element, and means for closing said switch upon the occurrence of an isolated event to be recorded.

9. In combination with the current responsive element of a curve-drawing recording instrument, means for passing a current through said element representative of a quantity, the values of which are to be continuously recorded, a supplementary recording circuit connected in parallel with said current responsive element, said supplementary recording circuit comprising a switch, a condenser, and a resistor in series, and means for closing said switch upon the occurrence of an isolated event to be recorded, said condenser being shunted by a unit comprising a source of direct current and a relatively high resistance in series.

10. In combination with the current responsive element of a recording instrument, means for passing a current through said element representative of a quantity, the values of which are to be continuously recorded, a condenser and a plurality of supplementary recording circuits connected in parallel with said current responsive element through said condenser, each of said circuits comprising a switch and an impedance in series, said condenser being shunted by a unit comprising a source of direct current and a relatively high resistance in series, each of said switches being arranged to close upon the occurrence of a different one of several isolated events to be recorded, said supplementary recording circuits having different time constants.

11. In combination with the current responsive element of a curve-drawing recording instrument, means for passing a current through said element representative of a quantity, the values of which are to be continuously recorded, a plurality of supplementary recording circuits and means for connecting each of said circuits in parallel with said current responsive element upon the occurrence of a different one of several isolated events to be recorded, said circuits being supplied with a source of direct current and having different circuit characteristics.

12. In combination with the current responsive element of a curve-drawing recording instrument, means for causing a current to flow in said element varying in accordance with variation in magnitude of a quantity to be recorded to produce a continuous record thereof, and a supplementary current source, and means for connecting said source to said element during a predetermined condition thereby superimposing a record of said condition upon the continuous record produced by said element.

13. In combination with an electrical system, a circuit breaker connected therein and an oscillograph having a current responsive element providing a continuous record of values of an electrical quantity in said system, and means for causing a supplementary current to flow in the recording element of said oscillograph upon the operation of said circuit breaker.

14. In combination with the current responsive element of a curve-drawing recording instrument, means for passing a current through said element representative of a quantity, the values of which are to be continuously recorded, switch-closing means responsive to the occurrence of an event to be recorded, a supplementary recording circuit connected in parallel with said current responsive element and including a source of direct current, an inductive impedance, and a switch operated by said switch-closing means.

15. In combination with an electrical system, a circuit breaker connected therein and a curve-drawing recording instrument having a record-receiving surface and a movable element in operative relation with a circuit in said system for producing a continuous record of the magnitude of an electrical quantity in a circuit of said system and other supplementary means responsive to the operation of said circuit breaker for producing additional relative movement of said element and said surface so as to superimpose on the continuous record a record of the operation of said circuit breaker.

ROY C. BUELL.

CERTIFICATE OF CORRECTION.

Patent No. 2,074,142. March 16, 1937.

ROY C. BUELL.

It is hereby certified that error appears in the printed specification of the above numbered patent requiring correction as follows: Page 4, first column, line 68, claim 10, before the word "recording" insert curve-drawing; and that the said Letters Patent should be read with this correction therein that the same may conform to the record of the case in the Patent Office.

Signed and sealed this 27th day of April, A. D. 1937.

(Seal)

Leslie Frazer
Acting Commissioner of Patents.